US009087239B2

(12) United States Patent
Kameyama

(10) Patent No.: US 9,087,239 B2
(45) Date of Patent: Jul. 21, 2015

(54) METHOD AND APPARATUS FOR UPDATING POSITION INFORMATION ASSOCIATED WITH AN IMAGE FILE

(71) Applicant: CANON KABUSHIKI KAISHA, Tokyo (JP)

(72) Inventor: Takaki Kameyama, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 13/738,128

(22) Filed: Jan. 10, 2013

(65) Prior Publication Data

US 2013/0188831 A1    Jul. 25, 2013

(30) Foreign Application Priority Data

Jan. 23, 2012    (JP) ................. 2012-011509

(51) Int. Cl.
*G06K 9/00*    (2006.01)
*G06F 17/30*    (2006.01)

(52) U.S. Cl.
CPC ...... *G06K 9/00664* (2013.01); *G06F 17/30265* (2013.01)

(58) Field of Classification Search
None
See application file for complete search history.

(56) References Cited

U.S. PATENT DOCUMENTS 5,383,127 A *    1/1995    Shibata ................. 701/446
2009/0228204 A1*    9/2009    Zavoli et al. ............ 701/208

FOREIGN PATENT DOCUMENTS

JP    2009-042132    2/2009

* cited by examiner

*Primary Examiner* — Nirav G Patel
(74) *Attorney, Agent, or Firm* — Cowan, Liebowitz & Latman, P.C.

(57) ABSTRACT

There is provided an information processing apparatus. An obtaining unit obtains positioning information from information associated with an image file. The positioning information includes positioning method information that indicates a positioning method and position information that indicates a position determined by the positioning method. A changing unit changes the position indicated by the position information. A determining unit determines whether or not an amount of change made by the changing unit is greater than or equal to a predetermined threshold. An updating unit updates the positioning method information associated with the image file, when it was determined that the amount of change is greater than or equal to the predetermined threshold.

13 Claims, 10 Drawing Sheets

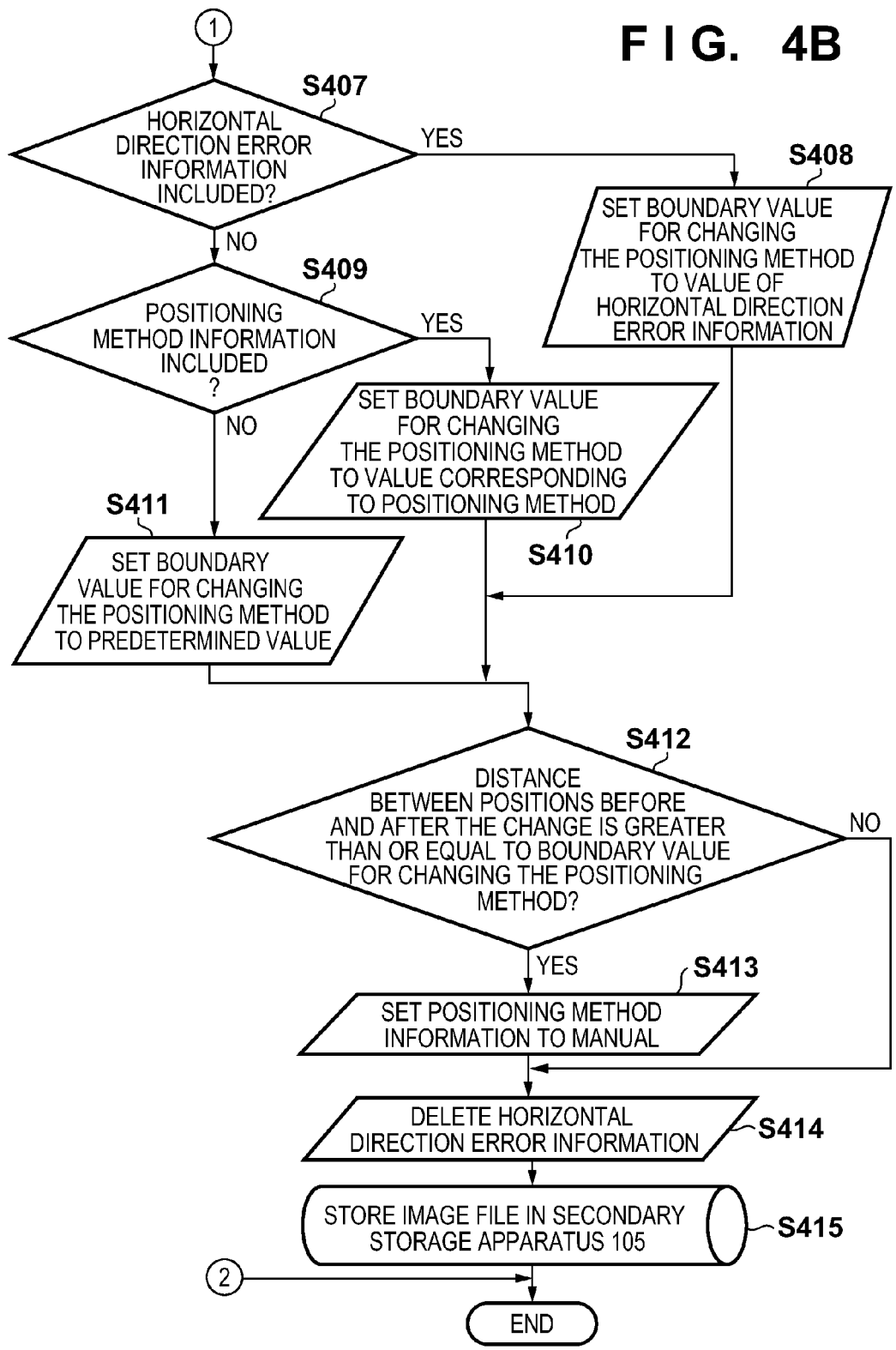

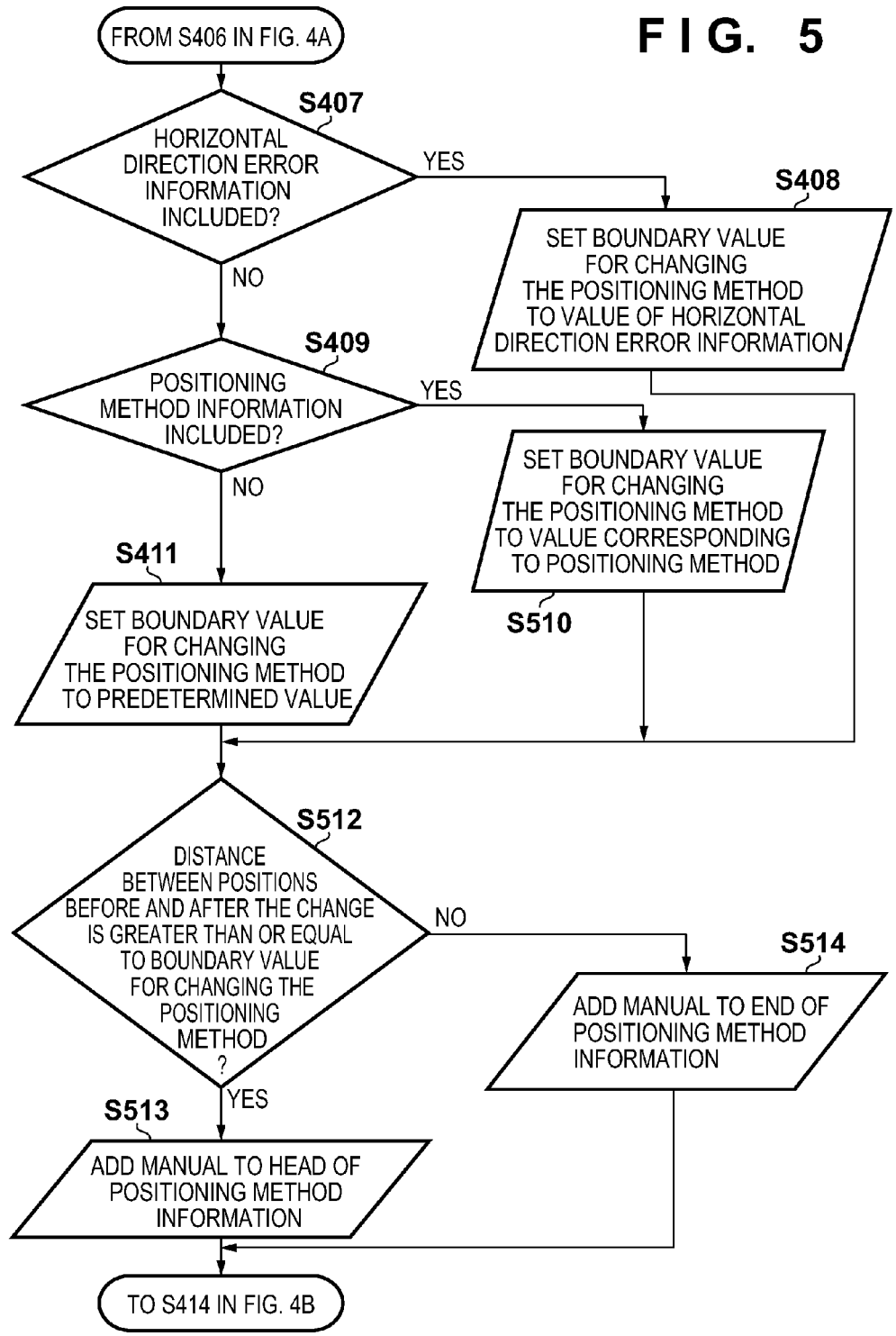

FIG. 6

POSITIONING INFORMATION PORTION                                203

SPOT INFORMATION

NORTH/SOUTH LATITUDE INFORMATION=N
LATITUDE DEGREE INFORMATION=35.34.0.3
EAST/WEST LONGITUDE INFORMATION=E
LONGITUDE DEGREE INFORMATION=139.40.49.5
ALTITUDE INFORMATION =30.78

POSITIONING METHOD INFORMATION=GPS
HORIZONTAL DIRECTION ERROR INFORMATION=12
HORIZONTAL DIRECTION ERROR INVALIDATION INFORMATION = YES

POSITIONING INFORMATION PORTION

EDITING POSITIONING INFORMATION PORTION

SPOT INFORMATION

NORTH/SOUTH LATITUDE INFORMATION=N
LATITUDE DEGREE INFORMATION=35.35.1.4
EAST/WEST LONGITUDE INFORMATION=E
LONGITUDE DEGREE INFORMATION=139.39.48.4
ALTITUDE INFORMATION=29.35

POSITIONING METHOD INFORMATION=GPS

INITIAL POSITIONING INFORMATION PORTION

INITIAL SPOT INFORMATION

NORTH/SOUTH LATITUDE INFORMATION=N
LATITUDE DEGREE INFORMATION=35.34.0.3
EAST/WEST LONGITUDE INFORMATION=E
LONGITUDE DEGREE INFORMATION=139.40.49.5
ALTITUDE INFORMATION=30.78

INITIAL POSITIONING METHOD INFORMATION=GPS
HORIZONTAL DIRECTION ERROR INFORMATION=12

METHOD AND APPARATUS FOR UPDATING POSITION INFORMATION ASSOCIATED WITH AN IMAGE FILE

BACKGROUND OF THE INVENTION

1. Field of the Invention

The present invention relates to an information processing apparatus and an information processing method.

2. Description of the Related Art

Along with the widespread use of digital cameras with a GPS function and mobile phones with a camera function and a GPS function, there has been increased in the number of imaging apparatuses that record, in a photographed image, position information about the spot where the image was photographed. A computer can display images, each having the position information, arranged on a map. Further, a user can modify position information of an image and add position information to an image in which no position information is recorded.

One method for recording position information as attribute information of an image file is the Exif standard. The Exif standard defines a method for recording, in an image file, position information and related information, such as information on the positioning method (e.g., GPS or wireless LAN access points) and positioning error. In addition, a technique is known that corrects position information on the basis of a recorded positioning error (see Japanese Patent Laid-Open No. 2009-42132). Meanwhile, a technique is also known in which a user modifies position information added to an image file to any position information with the use of a personal computer (PC) or the like.

In the case where position information of an image file in which a positioning method is recorded is modified by a user operation or the like, it becomes a problem how to handle the originally recorded positioning method. There is one way of thinking that the position information after the modification is information arbitrarily determined by a user and not information determined in accordance with the originally recorded positioning method. On the other hand, there is another way of thinking that, because a user knows the position information before the modification, the position information after the modification is not always determined independently of the position information before the modification, and thus is affected by the originally recorded positioning method to some extent.

However, there has conventionally been no method for appropriately processing an originally recorded positioning method in the case where position information recorded in an image file is modified by a user operation or the like. This problem can occur not only in the case where position information recorded in an image file is modified but also in various cases, provided that the position information and the positioning method are associated with each other.

SUMMARY OF THE INVENTION

The present invention has been accomplished in view of these circumstances, and provides a technique for appropriately processing positioning method information indicating a positioning method when position information associated with the positioning method information is changed.

According to an aspect of the present invention, there is provided an information processing apparatus comprising: an obtaining unit configured to obtain positioning information from information associated with an image file, the positioning information including positioning method information that indicates a positioning method and position information that indicates a position determined by the positioning method; a changing unit configured to change the position indicated by the position information; a determining unit configured to determine whether or not an amount of change made by the changing unit is greater than or equal to a predetermined threshold; and an updating unit configured to update the positioning method information associated with the image file, when it was determined that the amount of change is greater than or equal to the predetermined threshold.

According to another aspect of the present invention, there is provided an information processing method comprising: obtaining positioning information from information associated with an image file, the positioning information including positioning method information that indicates a positioning method and position information that indicates a position determined by the positioning method; changing the position indicated by the position information; determining whether or not an amount of change made in the changing is greater than or equal to a predetermined threshold; and updating the positioning method information associated with the image file, when it was determined that the amount of change is greater than or equal to the predetermined threshold.

According to the present invention, the above-mentioned configurations allow appropriately processing positioning method information indicating a positioning method when position information associated with the positioning method information is changed.

Further features of the present invention will become apparent from the following description of exemplary embodiments with reference to the attached drawings.

BRIEF DESCRIPTION OF THE DRAWINGS

FIGS. 4A and 4B are flowcharts illustrating flows of positioning information editing processing performed by the image processing apparatus 100 according to the first embodiment.

FIG. 5 is a flowchart illustrating a flow of positioning information editing processing performed by the image processing apparatus 100 according to the second embodiment.

FIG. 6 is a diagram illustrating an example of the positioning information portion 203 that includes horizontal direction error invalidation information.

FIG. 7 is a diagram illustrating an example of information held in a positioning information portion 203 according to the third embodiment.

DESCRIPTION OF THE EMBODIMENTS

Embodiments of the present invention will now be described with reference to attached drawings. It should be noted that the technical scope of the present invention is defined by claims, and is not limited by each embodiment described below. In addition, not all combinations of the features described in the embodiments are necessarily required for realizing the present invention.

The following embodiments will describe an image processing apparatus as an example of a positioning information processing apparatus. Positioning information to be processed includes position information indicating a position where an image was photographed, and positioning method information indicating a positioning method used to determine the position, and the positioning information is assumed to be recorded in an image file together with the image. Note, however, that the present invention is applicable not only to the positioning information that relates to a photographing position where an image was photographed, but also to any positioning information, provided that position information and a positioning method are associated with each other.

First Embodiment

Figure 1:
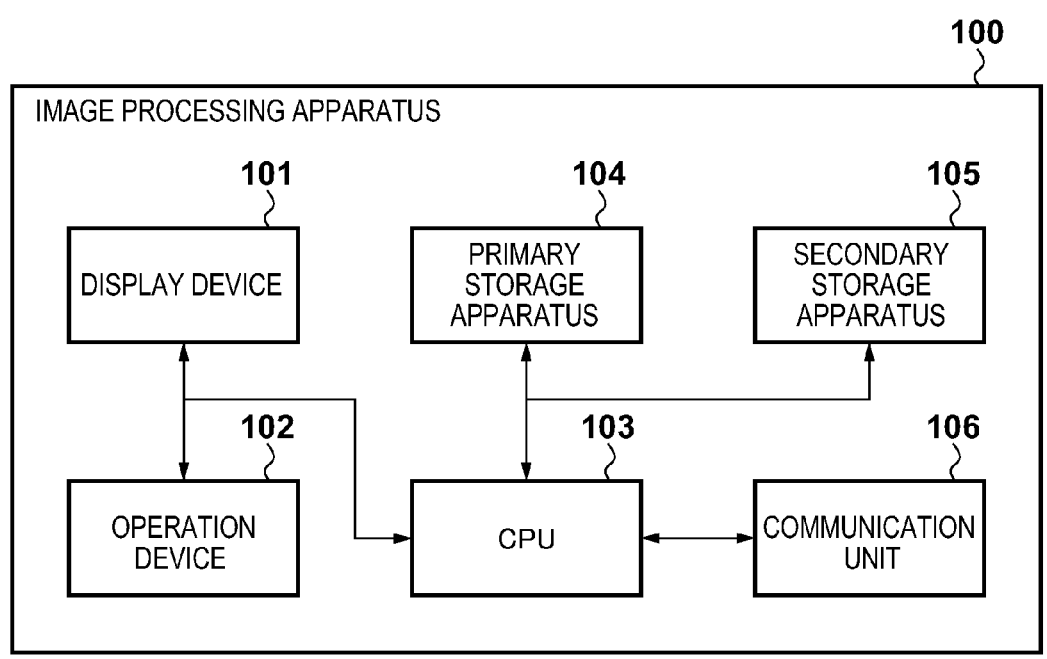
FIG. 1 is a block diagram illustrating a configuration of an image processing apparatus 100 according to first to third embodiments.

FIG. 1 is a block diagram illustrating a configuration of an image processing apparatus 100 according to a first embodiment. The image processing apparatus 100 includes a display device 101, an operation device 102, a CPU 103, a primary storage apparatus 104, a secondary storage apparatus 105, and a communication unit 106.

The display device 101, which is a liquid crystal display for example, displays data, such as characters or images, and a so-called graphical user interface (GUI), such as a menu. The operation device 102 includes a button, a lever, a touch panel, and the like and receives a user operation. The CPU 103 performs various types of calculations and controls blocks constituting the image processing apparatus 100. The primary storage apparatus 104 stores temporary data and is used for the operation of the CPU 103. The secondary storage apparatus 105 stores an operating system (OS) for controlling the image processing apparatus 100, and programs, files, etc. of various types of applications. The communication unit 106 communicates with another apparatus, such as a digital camera, and receives a variety of data, such as image files, from the another apparatus.

Figure 2:
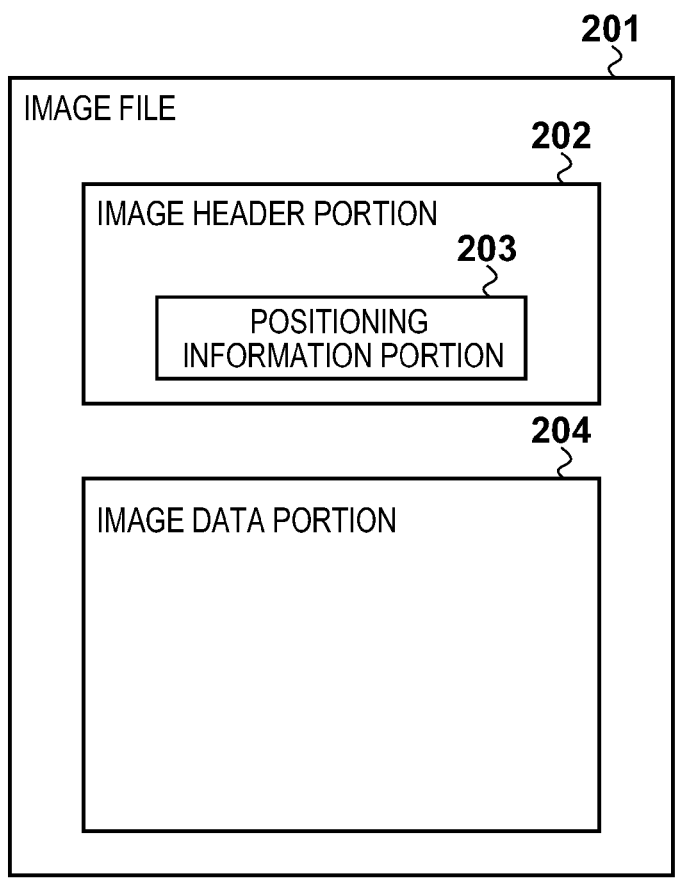
FIG. 2 is a diagram illustrating an example of an image file including image data and positioning information, the image file being processed by a program operating in the image processing apparatus 100.

FIG. 2 is a diagram illustrating an example of an image file including image data and positioning information, the image file being processed by a program operating in the image processing apparatus 100. The present embodiment assumes that an image file of a file format conforming to the Exif standard is adopted.

The image file 201 exists as a file recorded in the secondary storage apparatus 105. The image processing apparatus 100 obtains the image file 201 via the communication unit 106, for example. When the image processing apparatus 100 processes the image file 201, the image file 201 can be temporally copied to the primary storage apparatus 104.

An image header portion 202 holds information that is supplementary to the image data. Examples of the supplementary information include the photographing date and time, the shutter speed, the aperture value, and the ISO speed. The image header portion 202 includes a positioning information portion 203. The positioning information portion 203 holds position information, positioning method information, and the like, which are processed by the image processing apparatus 100. An image data portion 204 holds an image data main body.

Note that the image header portion 202 and the positioning information portion 203 are not necessarily limited to information in an Exif format. For example, the image header portion 202 and the positioning information portion 203 can be recorded in a file other than an image file or in a database possessed by the image processing apparatus 100.

Figure 3:
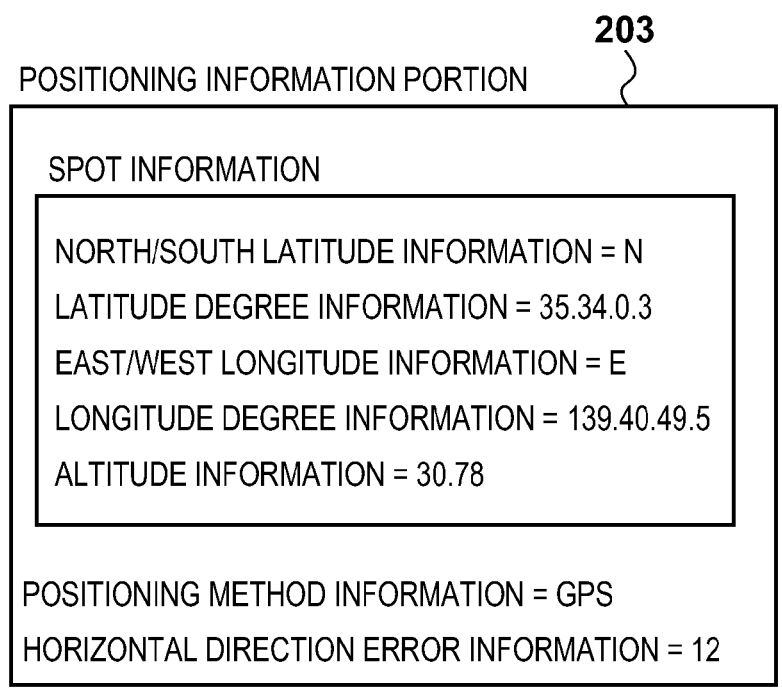
FIG. 3 is a diagram illustrating an example of information held in a positioning information portion 203 according to the first embodiment.

FIG. 3 is a diagram illustrating examples of information held in the positioning information portion 203. The positioning information portion 203 includes spot information (position information), positioning method information, and error information (horizontal direction error information). The spot information includes north/south latitude information, latitude degree information, east/west longitude information, longitude degree information, and altitude information.

The north/south latitude information indicates whether the value of the latitude degree information is a north latitude or a south latitude. The latitude degree information indicates the degree of latitude. The east/west longitude information indicates whether the value of the longitude degree information is an east longitude or a west longitude. The longitude degree information indicates the degree of longitude. The altitude information indicates the altitudes.

The positioning method information indicates the positioning method used to determine the spot information. The positioning method information according to the present embodiment can have four types of values as the positioning method.

The first positioning method is CELLID. This is a method for positioning using information on a mobile phone base station. There are various methods for obtaining the current position from a mobile phone base station. One example is a method that directly defines, as the current position of a mobile phone, the position of a base station with which the mobile phone communicates, and another example is a method that estimates the current position on the basis of a difference in arrival time of radio waves from a plurality of base stations and positions where the base stations are placed.

The second positioning method is WLAN. This is a positioning method that uses a wireless LAN. The current position is obtained from the wireless LAN in a manner as described below. That is, a digital camera that has a wireless LAN function receives radio waves from one or more wireless LAN access points, and the current position is estimated on the basis of the strength of the radio waves and the positions where the wireless LAN access points are placed.

The third positioning method is GPS. This is a method in which a GPS receiver receives information from a plurality of satellites so as to calculate the current position of the GPS receiver itself.

The fourth positioning method is MANUAL. MANUAL indicates that a user manually input position information (that is, the position indicated by the spot information was manually set). The cases in which the positioning method information is set to MANUAL can depend on the implementation of the digital camera. For example, it is considered that the positioning method information is set to MANUAL in cases where, for example, a user directly input a latitude and a longitude, or a latitude and a longitude are designated by a user operation designating a certain place on a map. Therefore, although no mechanical positioning is performed, to be exact, in the case where the positioning method information is set to MANUAL, MANUAL is also deemed to be included as one type of positioning method, for convenience.

The horizontal direction error information indicates error of the spot information in the horizontal direction, that is, error in the latitude degree information and the longitude degree information. The error is determined according to conditions when positioning is performed. For example, in the case of GPS, error is estimated from a DOP value, the number of GPS satellites from which the information was received, and radio wave strength.

In the example of FIG. 3, the north latitude is 35 degrees 34 minutes 0.3 seconds, the east longitude is 139 degrees 40 minutes 49.5 seconds, and the altitude is 30.78 m, the positioning method information indicates GPS, and the horizontal direction error information indicates 12 m.

Figure 4A:
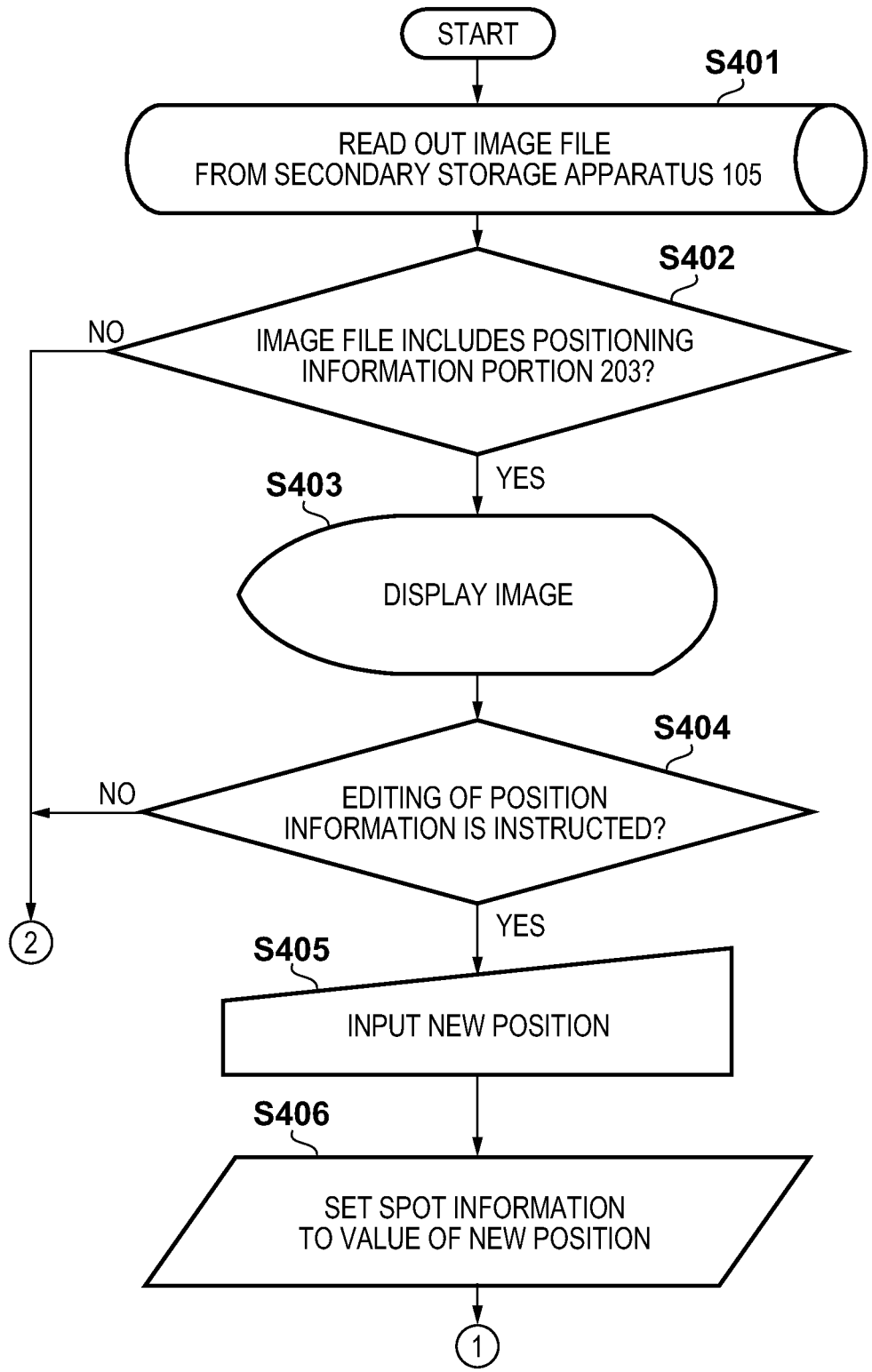

FIGS. 4A and 4B are flowcharts illustrating flows of positioning information editing processing performed by the image processing apparatus 100 according to the first embodiment. The processing of these flowcharts is performed by the CPU 103 reading out and executing a program recorded in the secondary storage apparatus 105. Note that the image processing apparatus 100 according to the present embodiment has already received a plurality of image files illustrated in FIG. 2 from a digital camera or the like, and stored them in the secondary storage apparatus 105.

In step S401, the CPU 103 reads out an image file from the secondary storage apparatus 105 and copies it to the primary storage apparatus 104. In step S402, the CPU 103 determines whether or not the image file that was read out includes the positioning information portion 203. If the positioning information portion 203 exists, the CPU 103 obtains positioning information from the image file, and the processing goes to step S403. Otherwise, since the positioning information to be processed does not exist, the processing of the present flowchart ends.

Figure 9:
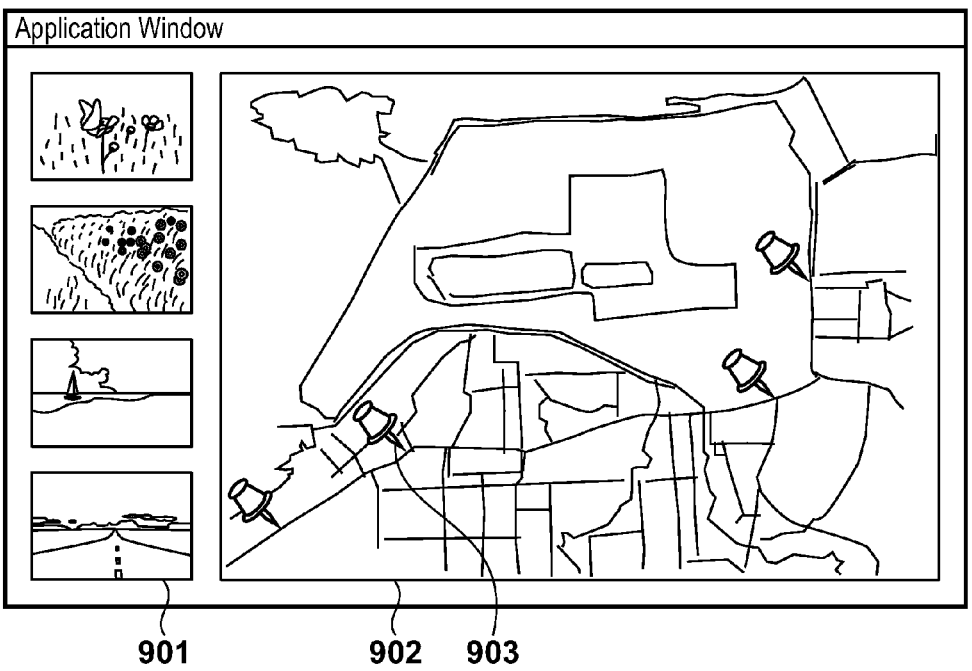
FIG. 9 is a diagram illustrating an example of display of images and photographing positions where the images were photographed.

In step S403, the CPU 103 causes the display device 101 to display the image data of the image file that was read out. FIG. 9 illustrates an example of the display screen. On the left side of the screen, reduced images 901 of images read out from the secondary storage apparatus 105 are displayed in a listed manner. On the right side of the screen, a map 902 is displayed. Marks 903 are displayed overlapping the positions that correspond to pieces of spot information recorded in the positioning information portions 203 of the respective image files. Further, when any of the marks is designated by a user operation, such as a mouse click, the reduced image of the corresponding image will be displayed in a pop-up. By viewing the screen, the user can easily recognize at which position the image was photographed. Note that the screen illustrated in FIG. 9 is an example and therefore another display configuration is also possible. For example, thumbnails, instead of marks, can be displayed directly on the map, and alternatively, other supplementary information, such as a name of the file or photographing date and time, may be displayed in the vicinity of the marks or the reduced images.

In step S404, the CPU 103 determines whether or not editing of the position information of the image file was instructed by the user. If editing was instructed, the processing goes to step S405, and otherwise the processing of the present flowchart ends. The editing of the position information in the present embodiment can be instructed by dragging any mark 903 using a mouse operation, shifting it to a desired position on the map, and dropping it. In this case, the determination in the present step is made by detecting the dragging of the mark 903. In order to prevent the user from carelessly shifting the mark 903, a button for changing to an edit mode may be provided in the screen of FIG. 9, so that the shift of a mark is allowed only in the edit mode. In this case, the determination in the present step may be made by detecting the change to the edit mode.

In step S405, the new position of the image is input by the user via the operation device 102. With reference to the above-mentioned example, the operation for inputting the position corresponds to an operation for dropping the dragged mark at a new position.

In step S406, the CPU 103 sets the spot information to a value indicating the new position that was input in step S405. With this measure, the spot information (position information) obtained in step S402 is changed.

In step S407, the CPU 103 determines whether or not the positioning information includes horizontal direction error information. If the positioning information includes horizontal direction error information, the processing goes to step S408, whereas, if the positioning information does not include horizontal direction error information, the processing goes to step S409.

In step S408, the CPU 103 sets a parameter which is a boundary value for changing the positioning method (a predetermined threshold). The boundary value for changing the positioning method is used in step S412, which will be described later, to determine whether or not the positioning method information is to be changed. In the present step S408, the CPU 103 sets the boundary value for changing the positioning method to the value of the horizontal direction error information.

In step S409, the CPU 103 determines whether or not the positioning information includes the positioning method information. If the positioning information includes the positioning method information (that is, the positioning information includes the positioning method information but not the horizontal direction error information), the processing goes to step S410. Otherwise, the processing goes to step S411.

In step S410, the CPU 103 sets the boundary value for changing the positioning method to a value corresponding to the positioning method indicated by the positioning method information. The value to be set here is a substitute for the horizontal direction error information used in step S408. An average value of positioning error is determined in advance according to the various types of positioning method, such as GPS, CELLID, or WLAN, and is set as the boundary value for changing the positioning method. The present embodiment assumes that the GPS, CELLID, and WLAN boundary values for changing the positioning method increase in this order. This is in consideration of predicted average sizes of positioning error in the positioning methods, but, the GPS, CELLID, and WLAN boundary values for changing the positioning method are not necessarily limited to being in such a relationship. When the positioning method information indicates MANUAL, the boundary value for changing the positioning method is set to 0.

In step S411, the CPU 103 sets the boundary value for changing the positioning method to a predetermined value. The value to be set here is a substitute for the horizontal direction error information used in step S408 and the positioning error corresponding to the positioning method used in step S410. Specifically, the value to be set here may be a value that differs from all of the values set in step S410, a value that corresponds to any one of the positioning methods, or the average value of the average errors of the positioning methods.

In step S412, the CPU 103 determines whether or not the distance from the position before the change obtained in step S402 to the position after the change that was input in step S405 is greater than or equal to a predetermined threshold, that is, whether or not the distance is greater than or equal to the boundary value for changing the positioning method. If the distance is greater than or equal to the boundary value for changing the positioning method, the processing goes to step S413, and otherwise the processing skips step S413 and goes to step S414.

Figure 10:
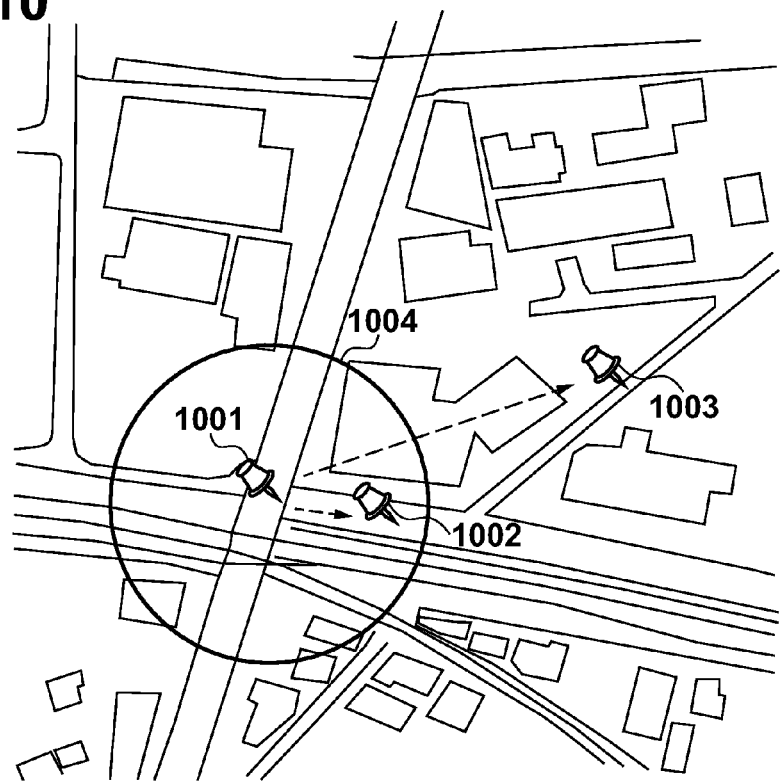
FIG. 10 is a diagram illustrating the significance of the determination in step S412 in FIG. 4B and step S812 in FIG. 8B.

The significance of the determination in step S412 will be described with reference to FIG. 10. In FIG. 10, a mark 1001 indicates the position of the spot information before the change. A circle 1004 is a circle whose center is the mark 1001 and whose radius corresponds to the boundary value for changing the positioning method. Therefore, within the circle 1004, the distance from the mark 1001 (the position before the change) is less than the boundary value for changing the positioning method, whereas on and outside of the circle 1004, the distance from the mark 1001 is greater than or equal to the boundary value for changing the positioning method. When the positioning information includes the horizontal direction error information, the circle 1004 is an error circle, which indicates horizontal direction error.

A mark 1002 indicates an example of a position after the change. The distance from the position before the change to the mark 1002 is less than the boundary value for changing the positioning method. Accordingly, the processing goes from step S412 to step S414. A mark 1003 indicates another example of a position after the change. The distance from the position before the change to the mark 1003 is greater than the boundary value for changing the positioning method. Accordingly, the processing goes from step S412 to step S413.

In the case where the distance between the positions before and after the change is greater than or equal to the boundary value for changing the positioning method (that is, in the case where the position after the change lies on or outside of the circle 1004), it is considered that the user has designated with some sort of intention a position other than the actual photographing position. In this case, the position before the change no longer has any significance, and therefore the positioning method related to the position before the change also no longer has any significance.

Therefore, in step S413, the CPU 103 sets the positioning method information to, instead of the original value (e.g., GPS), MANUAL that is a positioning method showing that the position indicated by the spot information was set manually. Alternatively, the CPU 103 may delete the value of the positioning method information.

On the other hand, in the case where the distance between the positions before and after the change is less than the boundary value for changing the positioning method (that is, in the case where the position after the change lies within the circle 1004), it is considered that the user trusted the original position to some extent but slightly corrected an error. In this case, it is possible to consider that the position after the change is also based to some extent on the positioning method related to the position before the change. Therefore, the processing in step S413 will be skipped, and the positioning method information will not be changed. For example, when the original positioning method information indicates GPS, it is considered that the user does not intend to modify the fact that positioning was performed with GPS, and therefore the positioning method information after the change of the position is kept indicating GPS.

In step S414, the CPU 103 deletes the horizontal direction error information. This is because the new position was designated by the user, and therefore the horizontal direction error information originally recorded in the image file no longer has any significance. Alternatively, instead of deleting the horizontal direction error information, the CPU 103 may set the horizontal direction error information to 0 or, as illustrated in FIG. 6, add horizontal direction error invalidation information to the positioning information portion 203. The horizontal direction error invalidation information is information indicating that the horizontal direction error information included in the positioning information portion 203 is invalid (invalidation information). In the case where the horizontal direction error information is set to 0, and in the case where the horizontal direction error invalidation information exists, the CPU 103 determines, in the determination in step S407, that the positioning information does not include the horizontal direction error information.

Note that the positioning information portion 203 may originally include "horizontal direction error invalidation information=NO" as the horizontal direction error invalidation information. In the case of "horizontal direction error invalidation information=NO", the horizontal direction error information is valid (in other words, this corresponds to a case where the horizontal direction error invalidation information is not included). In this case, in step S414, the CPU 103 changes the value of the horizontal direction error invalidation information to "horizontal direction error invalidation information=YES".

In step S415, the CPU 103 stores the image file including the positioning information after the change in the secondary storage apparatus 105.

As has been described above, according to the present embodiment, the image processing apparatus 100 determines whether or not the positioning method information is to be changed, according to whether or not a distance between the positions before and after the change is greater than or equal to a predetermined threshold. This allows appropriately processing positioning method information indicating a positioning method, when position information associated with the positioning method information is modified.

Second Embodiment

The first embodiment has been described on the assumption that the positioning method information indicates only one positioning method. In contrast, the second embodiment assumes that the positioning method information can include a plurality of positioning methods in a ranking. Note however that, in the second embodiment as well, there are cases where the positioning method information includes only one positioning method. In the present embodiment, a basic configuration of the image processing apparatus 100 is equivalent to that of the first embodiment (see FIG. 1).

Positioning method information according to the second embodiment will first be described. Some apparatuses of recent years, such as a mobile phone with a camera, perform a so-called hybrid type positioning in which a plurality of positioning methods are combined together so as to obtain more accurate spot information. The present embodiment assumes that, in such a case, all positioning methods that have been used are included in the positioning method information. For example, when positioning has been performed on the basis of GPS and information on mobile phone base stations, the positioning method information indicates "GPS CELLID". The present embodiment further assumes that a plurality of positioning methods included in the positioning method information are described in the order of greatest extent of contribution when spot information was determined. The extents of contribution are calculated based, for example, on how small the magnitudes of respective error in positioning are and on predetermined reliabilities of the positioning methods themselves. The example of the above-mentioned "GPS CELLID" shows that the positioning method using GPS contributes to a greater extent than the positioning method using mobile phone base stations.

FIG. 5 is a flowchart illustrating a flow of positioning information editing processing performed by the image processing apparatus 100 according to the second embodiment. The processing of the present flowchart is performed by the CPU 103 reading out and executing a program recorded in the secondary storage apparatus 105. In FIG. 5, the processing before step S407 and the processing after step S514 are equivalent to those in the first embodiment (steps S401 to S406 and steps S414 to S415 in FIGS. 4A and 4B), and thus illustrations thereof are omitted. Although steps S407 to S409 and S411 are illustrated, the processing in these steps is equivalent to that in the first embodiment (steps S407 to S409, and S411 in FIG. 4B).

In step S510, as with step S410 in FIG. 4B, the CPU 103 sets the boundary value for changing the positioning method to a value that corresponds to the positioning methods indicated by the positioning method information. If the positioning method information includes only one positioning method, the processing in the present step is the same as that in step S410 in FIG. 4B. On the other hand, if the positioning method information includes a plurality of positioning methods, the CPU 103 sets the boundary value for changing the positioning method on the basis of only the positioning method that has the highest extent of contribution (that is, of the highest rank). Alternatively, the CPU 103 may set the boundary value for changing the positioning method to a value that is calculated, taking into consideration the respective extents of contribution of the plurality of positioning methods. In the case where MANUAL is included as one of the positioning methods, MANUAL itself is considered to be converted into 0.

In step S512, the CPU 103 determines whether or not the distance from the position before the change obtained in step S402 to the position after the change that was input in step S405 is greater than or equal to the predetermined threshold, that is, the distance is greater than or equal to the boundary value for changing the positioning method. If the distance is greater than or equal to the boundary value for changing the positioning method, the processing goes to step S513, and otherwise the processing goes to step S514.

In the case where the processing goes from step S512 to step S513, it is considered that manual setting contributed to the greatest extent to the determination of the position after the change. Accordingly, in step S513, the CPU 103 adds MANUAL to the head of the positioning method information (that is, MANUAL is added to the positioning method information with the highest rank). The processing in step S513 differs from that in the first embodiment (step S413 in FIG. 4B) in that the original positioning method remains with the second or subsequent rank even after MANUAL is added. Alternatively, in step S513, the CPU 103 may delete at least one of the values of the positioning method information, instead of adding MANUAL.

In the case where the processing goes from step S512 to step S514, it is considered that manual setting contributes relatively little to the decision of the position after the change. Accordingly, in step S514, the CPU 103 adds MANUAL to the end of the positioning method information (that is, MANUAL is added to the positioning method information with the lowest rank). The processing in step S514 differs from step of the first embodiment (the configuration in which step S413 in FIG. 4B is skipped) in that MANUAL is still included, although with the lowest rank, in the positioning method information. Alternatively, in step S513, the CPU 103 can delete at least one of the values of the positioning method information, instead of adding MANUAL.

As has been described above, according to the present embodiment, the image processing apparatus 100 adds MANUAL with the highest or lowest rank to the positioning method information, according to whether or not the distance between the positions before and after the change is greater than or equal to a predetermined threshold. This allows appropriately processing positioning method information indicating positioning methods, when position information associated with the positioning method information is modified.

Third Embodiment

In the third embodiment, the positioning information portion 203 is configured as illustrated in FIG. 7, and the third embodiment differs from the first embodiment (see FIG. 3) in this regard. In the present embodiment, a basic configuration of the image processing apparatus 100 is equivalent to that of the first embodiment (see FIG. 1).

As illustrated in FIG. 7, the positioning information portion 203 includes an editing positioning information portion and an initial positioning information portion. The initial positioning information portion indicates initial values (values before the change) of the editing positioning information portion. In other words, the initial positioning information portion keeps holding the content of the positioning information recorded when the image was photographed. Since the editing of the positioning information portion 203 by the image processing apparatus 100 is performed with respect to the editing positioning information portion, the content of the initial positioning information portion is not changed. The initial values of the editing positioning information portion are the same as the values of the initial positioning information portion. Alternatively, it is also possible that there is initially no editing positioning information portion, and the editing positioning information portion is then generated when the editing of the positioning information portion 203 is performed.

The editing positioning information portion includes, as with the first embodiment (see FIG. 3), spot information and positioning method information. Before the spot information is changed, the editing positioning information portion may include the same horizontal direction error information as that included in the initial positioning information portion.

The initial positioning information portion includes initial spot information (initial position information) that indicates initial values of the spot information, and initial positioning method information that indicates the initial values of the positioning method information. The initial positioning information portion may also include the horizontal direction error information that indicates error with respect to the initial spot information.

Figure 8A:
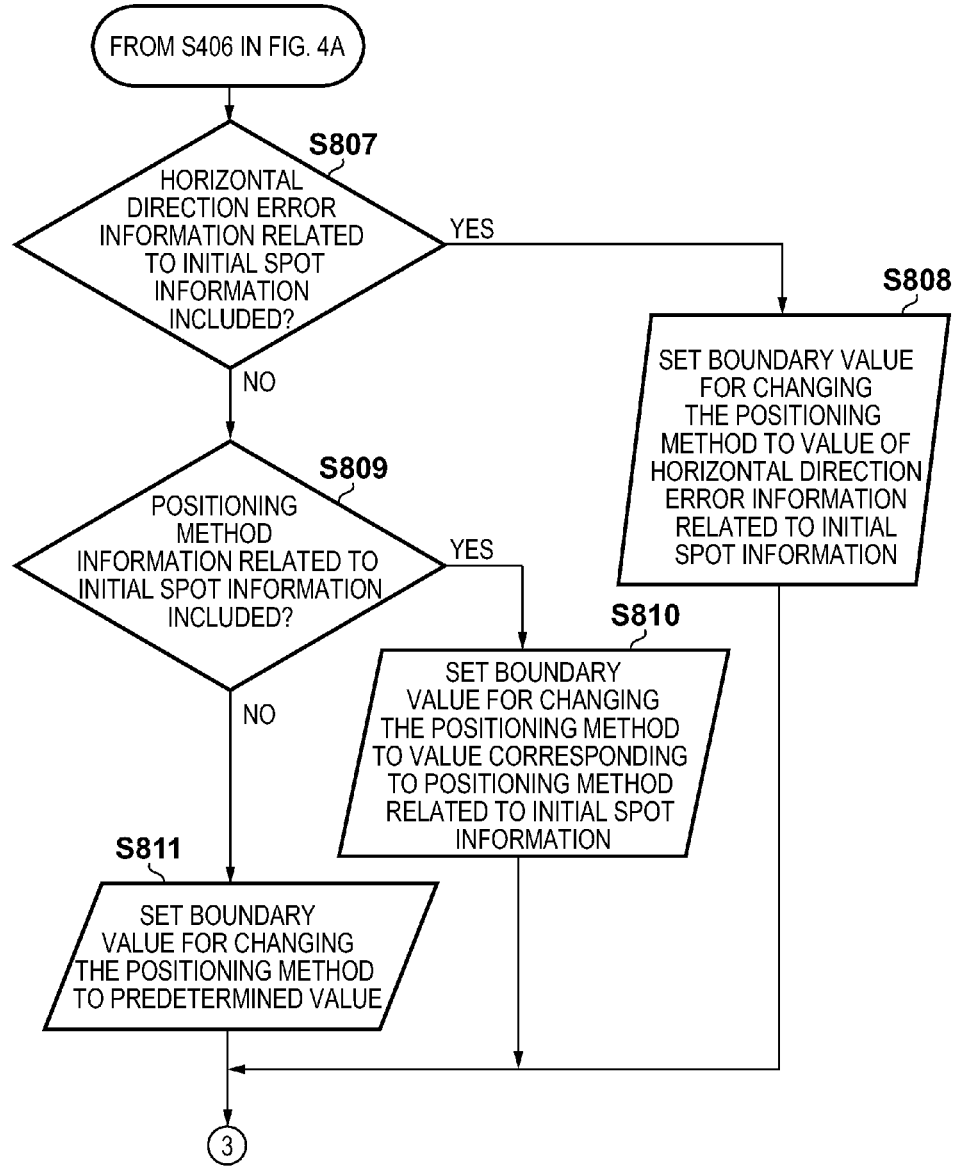
FIGS. 8A and 8B are flowcharts illustrating flows of positioning information editing processing performed by the image processing apparatus 100 according to the third embodiment.
Figure 8B:
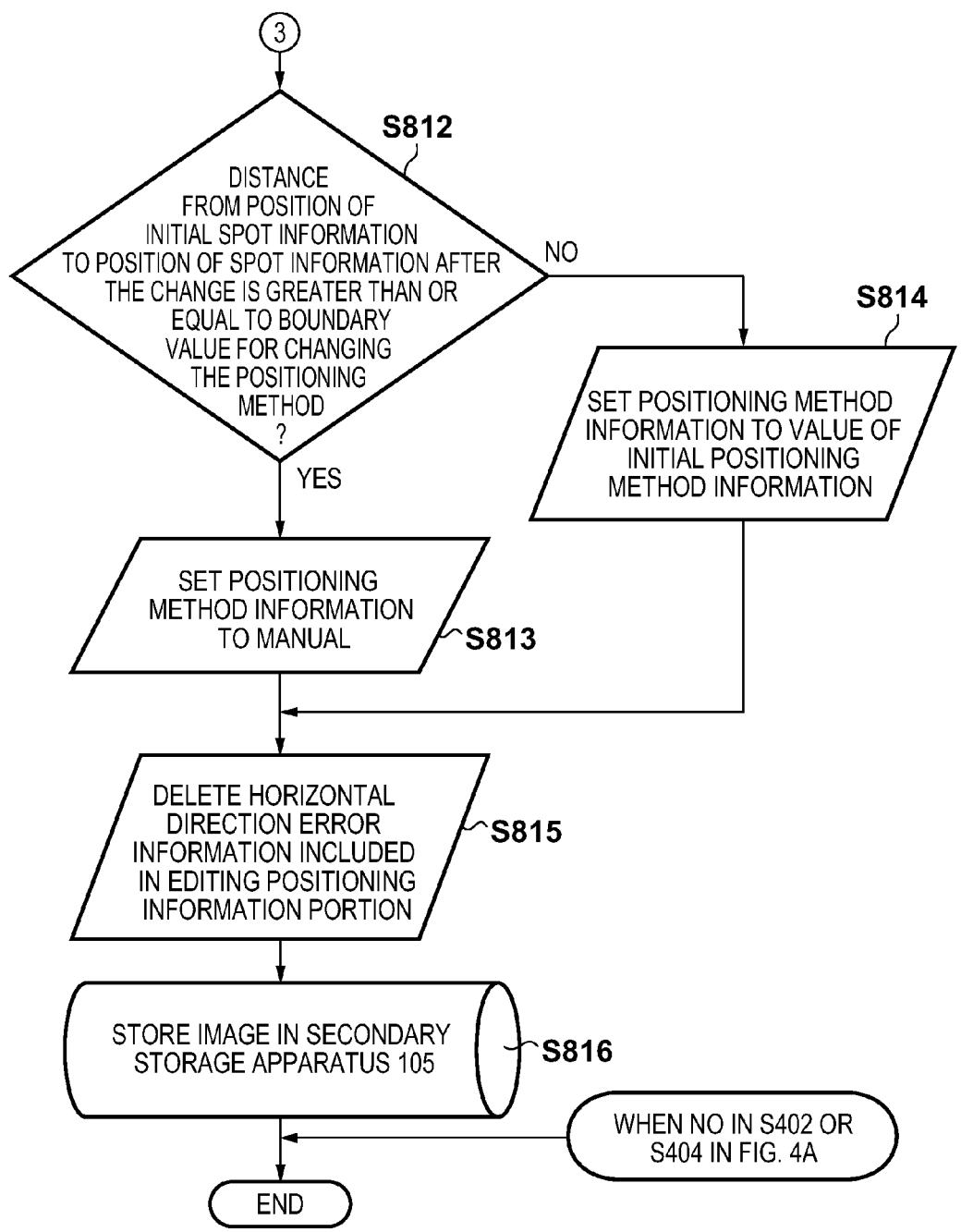

FIGS. 8A and 8B are flowcharts illustrating flows of positioning information editing processing performed by the image processing apparatus 100 according to the third embodiment. The processing of the present flowcharts is performed by the CPU 103 reading out and executing a program recorded in the secondary storage apparatus 105. In FIGS. 8A and 8B, the processing before step S807 is equivalent to the processing of the first embodiment (steps S401 to S406 in FIG. 4A), and therefore illustrations thereof are omitted. In step S403, however, when the editing positioning information portion exists, then the mark 903 in FIG. 9 will be displayed on the basis of the spot information therein, whereas when no editing positioning information portion exists, then the mark 903 in FIG. 9 will be displayed on the basis of the initial spot information. Further in step S406, the spot information of the editing positioning information portion is changed, whereas the initial spot information is not changed.

The processing from step S807 to step S811 is substantially the same as the processing in the first embodiment (steps from S407 to S411). However, the horizontal direction error information referenced in steps S807 and S808 is the horizontal direction error information related to the initial spot information (not the spot information in the editing positioning information portion). The positioning method information referenced in steps S809 and S810 is the initial positioning method information (not the positioning method information in the editing positioning information portion).

In step S812, the CPU 103 determines whether or not the distance from the position indicated by the initial spot information to the position indicated by the spot information after the change in step S406 is greater than or equal to the boundary value for changing the positioning method. If the distance is greater than or equal to the boundary value for changing the positioning method, the processing goes to step S813, and otherwise the processing goes to step S814.

The significance of the determination in step S812 will be described with reference to FIG. 10. In FIG. 10, the mark 1001 indicates the position of the initial spot information. The circle 1004 is a circle whose center is the mark 1001 and whose radius corresponds to the boundary value for changing the positioning method. Therefore, within the circle 1004, the distance from the mark 1001 (the position of the initial spot information) is less than the boundary value for changing the positioning method, whereas on and outside of the circle 1004, the distance from the mark 1001 is greater than or equal to the boundary value for changing the positioning method. When the initial positioning information includes the horizontal direction error information, the circle 1004 is an error circle, which indicates horizontal direction error.

The mark 1002 indicates an example of a position of spot information after the change. The distance from the position of the initial spot information to the mark 1002 is less than the boundary value for changing the positioning method. Accordingly, the processing goes from step S812 to step S814. The mark 1003 indicates another example of a position of the spot information after the change. The distance from the position of the initial spot information to the mark 1003 is greater than or equal to the boundary value for changing the positioning method. Accordingly, the processing goes from step S812 to step S813.

As such, the distance to be compared with the boundary value for changing the positioning method is always determined on the basis of the position indicated by the initial spot information. Note that, in the first embodiment, when the spot information has been changed in the past, "the position before the change" means "the position after the most recent change in the past". Accordingly, in the third embodiment, even when the spot information is changed repeatedly, it is possible to appropriately process the positioning method information according to the initial values of the spot information and the positioning method information.

In step S813, the CPU 103 sets the positioning method information of the editing positioning information portion to, instead of the original value (e.g., GPS), MANUAL that is a positioning method indicating that the position indicated by the spot information was set manually.

On the other hand, in step S814, the CPU 103 sets the positioning method information of the editing positioning information portion to the value of the initial positioning method information. Therefore, even when MANUAL has been set as the positioning method information due to the change in the spot information in the past, it is possible to restore the original positioning method in the positioning method information of the editing positioning information portion if the vicinity of the position indicated by the initial spot information is designated by the current change. Therefore, even if a position that is distanced at greater than or equal to the value of the horizontal direction error information in the initial positioning information portion is designated, it is possible to later restore the original positioning method information if a position in the vicinity of the position of the initial spot information is designated.

The processing in steps S815 and S816 is equivalent to the processing in steps S414 and S415 in FIG. 4B. However, the information to be deleted in step S815 is the horizontal direction error information included in the editing positioning information portion. Further, in the case where the spot information in the editing positioning information portion matches to the initial spot information, the horizontal direction error information of the initial positioning information portion may be copied to the editing positioning information portion.

As has been described above, according to the present embodiment, the positioning information portion 203 holds the initial values of the spot information and the positioning method information. When changing the spot information, the image processing apparatus 100 processes the positioning method information on the basis of the initial values of the spot information and the positioning method information. Accordingly, even when the spot information is changed repeatedly, it is possible to appropriately process the positioning method information according to the initial values of the spot information and the positioning method information.

Other Embodiments

Aspects of the present invention can also be realized by a computer of a system or apparatus (or devices such as a CPU or MPU) that reads out and executes a program recorded on a memory device to perform the functions of the above-described embodiments, and by a method, steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-011509, filed on Jan. 23, 2012, which is hereby incorporated by reference herein in its entirety.

What is claimed is:
1. An information processing apparatus comprising:
an obtaining unit configured to obtain positioning information from information associated with an image file, the positioning information including positioning method information that indicates a positioning method and position information that indicates a position determined by the positioning method;
a changing unit configured to change the position indicated by the position information obtained by the obtaining unit;

a determining unit configured to determine whether or not an amount of change made by the changing unit is greater than or equal to a predetermined threshold; and an updating unit configured to update the positioning method information associated with the image file whose position information is changed, when it was determined that the amount of change is greater than or equal to the predetermined threshold.

2. The information processing apparatus according to claim 1, wherein the updating unit updates the positioning method information so that the positioning method information indicates a predetermined positioning method that indicates that the position indicated by the position information was set manually, when it was determined that the amount of change is greater than or equal to the predetermined threshold.

3. The information processing apparatus according to claim 1, wherein the positioning method information is capable of including a plurality of positioning methods in a ranking, and the updating unit updates the positioning method information so that the positioning method information includes, with a higher rank than another positioning method, a predetermined positioning method that indicates that the position indicated by the position information was set manually, when it was determined that the amount of change is greater than or equal to the predetermined threshold.

4. The information processing apparatus according to claim 1, wherein the positioning method information is capable of including a plurality of positioning methods in a ranking, and the updating unit updates the positioning method information so that the positioning method information includes, with a lower rank than another positioning method, a predetermined positioning method that indicates that the position indicated by the position information was set manually, when it was determined that the amount of change is less than the predetermined threshold.

5. The information processing apparatus according to claim 1, wherein, when the positioning information includes error information that indicates error in the position indicated by the position information, the determining unit uses the error as the predetermined threshold.

6. The information processing apparatus according to claim 5, wherein the changing unit, when performing the change, deletes the error information, sets the error information to 0, or adds, to the positioning information, invalidation information indicating that the error information is invalid, and the determining unit determines that the positioning information does not include the error information, when the error information is set to 0, or when the positioning information includes the invalidation information.

7. The information processing apparatus according to claim 1, wherein the determining unit uses, as the predetermined threshold, a value that corresponds to the positioning method indicated by the positioning method information.

8. The information processing apparatus according to claim 1, wherein the positioning information further includes initial positioning method information that indicates an initial value of the positioning method information, and initial position information that indicates an initial value of the position information, and the determining unit determines whether or not a distance from a position indicated by the initial position information to a position after the change that is indicated by the position information is greater than or equal to the predetermined threshold.

9. The information processing apparatus according to claim 8, wherein, when the positioning information includes error information that indicates error in the position indicated by the initial position information, the determining unit uses the error as the predetermined threshold, and when the positioning information does not include the error information, the determining unit uses, as the predetermined threshold, a value that corresponds to the positioning method indicated by the initial positioning method information.

10. The information processing apparatus according to claim 1, wherein the obtaining unit obtains the positioning information from the image file that includes image data and the positioning information.

11. The information processing apparatus according to claim 1, wherein the updating unit deletes at least one positioning method indicated by the positioning method information, when it was determined that the amount of change is greater than or equal to the predetermined threshold.

12. An information processing method comprising:

obtaining positioning information from information associated with an image file, the positioning information including positioning method information that indicates a positioning method and position information that indicates a position determined by the positioning method;

changing the position indicated by the position information obtained in said obtaining;

determining whether or not an amount of change made in said changing is greater than or equal to a predetermined threshold; and updating the positioning method information associated with the image file whose position information is changed, when it was determined that the amount of change is greater than or equal to the predetermined threshold.

13. A non-transitory computer-readable storage medium storing a program for causing a computer to execute the information processing method according to claim 12.

* * * * *